United States Patent
Phuong et al.

(10) Patent No.: US 8,977,733 B1
(45) Date of Patent: Mar. 10, 2015

(54) CONFIGURING HOST NETWORK PARAMETERS WITHOUT POWERING ON A HOST SERVER

(75) Inventors: Scott Phuong, Sunnyvale, CA (US); Robert Ling, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 267 days.

(21) Appl. No.: 13/174,901

(22) Filed: Jul. 1, 2011

(51) Int. Cl.
*G06F 15/173* (2006.01)

(52) U.S. Cl.
USPC ............................ 709/223; 709/220; 709/221

(58) Field of Classification Search
CPC ........................ H04L 41/0813; H04L 41/0833
USPC ......................................... 709/220, 221, 223
See application file for complete search history.

(56) References Cited

U.S. PATENT DOCUMENTS 7,366,123 B1  4/2008  Biederman
2011/0078299 A1*  3/2011  Nagapudi et al. ............. 709/223

* cited by examiner

*Primary Examiner* — Thanh Tammy Nguyen
*Assistant Examiner* — Jonathan Bui
(74) *Attorney, Agent, or Firm* — Edell, Shapiro & Finnan, LLC

(57) ABSTRACT

Techniques are provided to adjust network settings for network connectivity resources used by a host server. A network card device, coupled to the host server, receives instructions to adjust network settings associated with the host server. Power is received from the host server at the network card device in order to allow the network card device to configure the network settings while the host server is in a standby mode. The network card device receives commands to adjust the network settings while the host server is in the standby mode.

14 Claims, 5 Drawing Sheets

CONFIGURING HOST NETWORK PARAMETERS WITHOUT POWERING ON A HOST SERVER

TECHNICAL FIELD

The present disclosure relates to configuring network related parameters associated with a host server.

BACKGROUND

A host server of a network can be configured with parameters that establish network policies. When host servers are not performing network operations (e.g., the host servers are "off"), the host server is typically maintained in a standby mode. When the host servers are performing network operations (e.g., when the host servers are "on"), the host server is in a normal operational mode. A power supply provides the necessary power level to maintain the host server in the standby mode and/or the normal mode.

A network card device is used to provide network connectivity for a host server. Currently, when a network setting of the network card device needs to be changed, the host server needs to be re-booted in order for those changes to take effect.

DESCRIPTION OF EXAMPLE EMBODIMENTS

Overview

Techniques are provided to adjust network settings for network connectivity resources used by a host server. A network card device, coupled to the host server, receives instructions to adjust network settings associated with the host server. Power is received from the host server at the network card device in order to allow the network card device to configure the network settings while the host server is in a standby mode. The network card device receives commands to adjust the network settings while the host server is in the standby mode.

Example Embodiments

Figure 1:
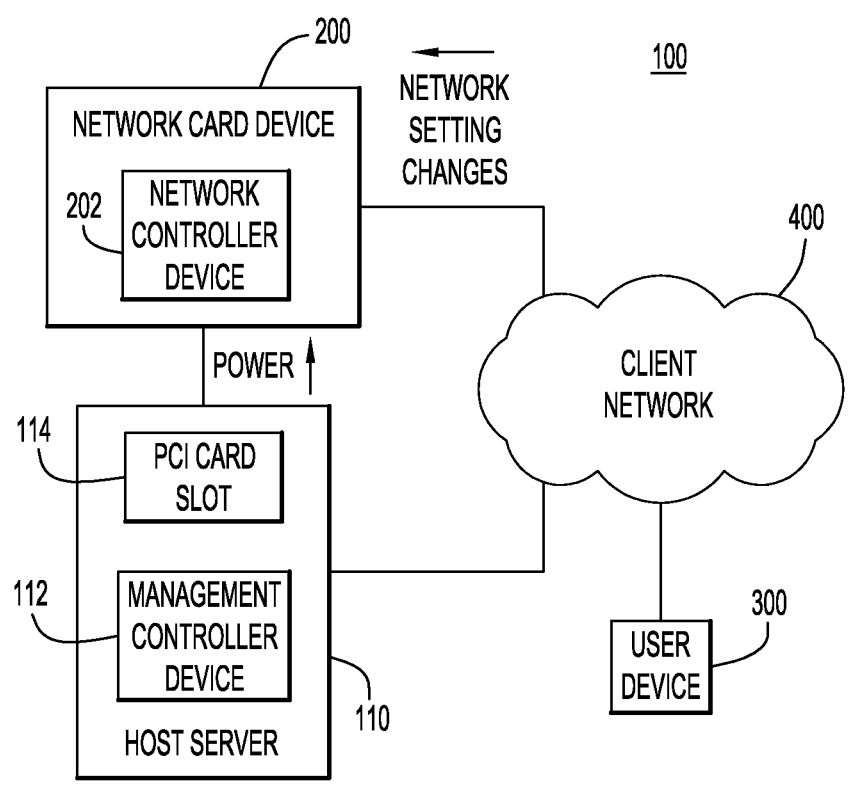
FIG. 1 shows an example network topology that supports user access to a host server and a network card device via a client network to make changes to network settings of the network card device without requiring powering on of the host server.

FIG. 1 shows an example of a system 100 featuring a host server 110 comprising a management controller device 112 and a Peripheral Component Interconnect (PCI) card slot 114. The PCI card slot may be configured in accordance with the PCI Express (PCIe) standard. System 100 also features a network card device 200 coupled to the host server 110 and comprising a network controller device 202. In one example, the network card device 200 may reside within the host server device 110, but for simplicity, the network card device 200 is shown as residing outside the host server device 110 in FIG. 1. The host server 110 and network card device 200 are configured to communicate with a user device 300 across a network 400, also referred to herein as a "client" network. In one example, the client network 400 may communicate directly with the management controller device 112 of the host server 110, for example, when the management controller device 112 shares the same network port as the host server 110 (e.g., when the port is a local area network (LAN) on motherboard (LOM) port) or indirectly, for example, via an add-in port to support communications with network card device 200 in an enhanced standby power state.

In one embodiment, the PCI card slot device 114 of the host server 110 is configured to interface with a PCI connector on the network card device 200, as described herein. In another embodiment, the host server 110 is configured to couple to the network card device 200 via an external cable, as described herein. The network controller device 202 of the network card device 200 is configured to transmit and receive communications between the network card device 200, host server 110 and client network 400. For example, the network controller device 202 may be a network controller device configured to monitor network settings associated with host server 110 and to receive commands (e.g., from user device 300 across client network 400) to adjust or modify the network settings of the network card device 200 used by the host server 110, as described herein. Client network 400 may be any network configured to enable communications between user device 300, host server 110 and network card 200. For example, client network 400 may be a wired or wireless Local Area Network (LAN), wired or wireless Wide Area Network (WAN), etc. The host server 110 may be a blade server that is mounted in a rack with a plurality of other similar blade servers. The host server 110 may also be a rack or rackable server.

According to the techniques described herein, the host server 110 supplies power to the network card device 200 so that the network card device 200 can communicate with a user device in order to receive network setting change commands from the user device and make those changes effective for the host server without powering on and booting up the host server 110. Thus, the host server 110 need not be powered on and in a normal operational mode when the network settings are changed. However, it is to be understood that wall or rack power is coupled to the host server 110 so that power is available from the host server 110 even when it is not powered on and booted up.

Figure 2:
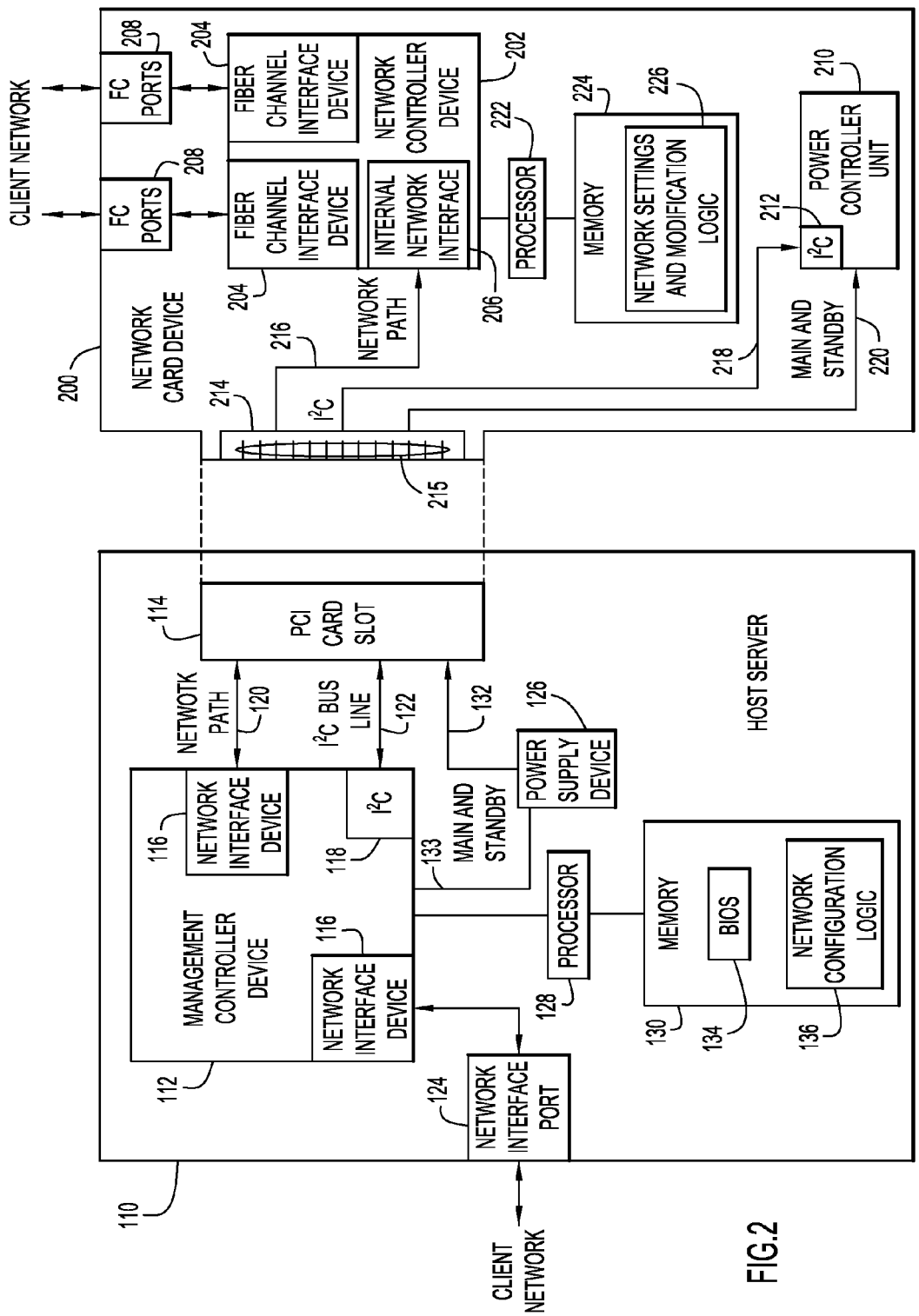
FIG. 2 is an example block diagram of the host server and the network card device connected to each other by a card slot according to one embodiment, and configured to enable network setting changes without powering on the host server.

Turning to FIG. 2, a block diagram of host server 110 connected to the network card device 200 across a network path according to one embodiment, is now described. As stated above, host server 110 comprises a management controller device 112 and a PCI card slot 114 coupled to the management controller device 112. The management controller device 112 comprises multiple network interface devices 116 and an I²C port 118 configured to transmit and receive power and commands as described herein. The management controller device 112 transmits and receives network communications with the PCI card slot 114 across a network path 120 established between one or more of the network interface devices 116 of the management controller device 112 and the PCI card slot 114. For example, the network interface devices 116 of the management controller may be Ethernet or Fibre (or Fiber) Channel (FC) interface devices. Additionally, the management controller device 112 transmits and receives power with the PCI card slot 114 across a power path (e.g., an I²C management bus line) 122, as described herein.

The host server 110 also comprises a network interface port 124 coupled to the management controller device 112 that is configured to transmit and receive communications over the client network 400. For example, network interface port 124 of the host server 110 may be an Ethernet port or an FC port configured to receive network communications originating from user device 300 across client network 400. The host server 110 further comprises a power supply device 126, a processor 128 and a memory 130. It should be appreciated, however, that the host server 110 may comprise multiple processors, but for simplicity, a single processor 128 is shown and described herein. The power supply device 126 is coupled to the PCI card slot 114 and is configured to deliver power to the PCI card slot 114 across a power path (e.g., an I²C management bus line) 132, as described herein. The processor 128 is coupled to the management controller device 112 and to the memory 130. The memory 130 is configured to store executable instructions for Basic Input/Output Settings (BIOS) 134 and for network configuration logic 136, the operations of which are described hereinafter.

FIG. 2 also shows components of network card device 200. As stated above, network card device 200 comprises a network controller device 202. The network controller device 202 also comprises multiple FC interface devices 204 and an internal network interface device 206. The FC interface devices 204 are configured to communicate with FC ports 208 on the network card device 200. The FC ports 208 transmit and receive communications from client network 400 (for example, communications originating from user device 300) according to the FC standard. In one example, FC ports 208 may also be configured to be an Ethernet port or an FC port configured to receive network communications originating from user device 300 across client network 400.

The network card device 200 also comprises a power controller unit 210 that includes an I²C port 212 configured to transmit and receive power as described herein. A connector 214 (comprising a set of pins 215) are disposed on the network card device 200 that are configured, in one embodiment, to engage the PCI card slot 114 of the host server 110. The network card device 200 also has a processor 222 and a memory 224. The processor 222 is coupled to the network controller device 202 and to memory 224. Memory 224 stores executable instructions for network settings and modification logic 226.

When the connector 214 is installed in the PCI card slot 114 of the host server 110, a network path 216 is established between the PCI card slot 114 and the network controller device 202. Additionally, power paths (e.g., I²C management bus lines) 218 and 220 are established between the PCI card slot 114 and the management controller device 112. In one example, the host server 110 assigns an identifier for the network card device 200 to indicate that the network card device 200 is coupled with the PCI card slot 114.

A user device 300 may access the host server 110 using a dedicated method by communicating with the management controller device 112 through client network 400. The user device 300 may also access the host server 110 using a shared method by communicating with the management controller device 112 through the network card device 200. The dedicated method and shared method allow the user device 300 to modify network settings of the host server 110 and network settings for one or more network ports on the network card device 200 that are used by the host server 110. For example, a user device 300 may access management controller device 112 on host server 110 via the network card device 200 (after network path 216 has been established) to configure or modify network settings of the host server 110. In this example, user device 300 may send commands that are configured to cause management controller device 112 to modify the BIOS 134 in memory 130 and to configure or modify the network settings. In one example, the management controller device 112 modifies the network settings by communicating directly with the network controller device 202 via a communication path involving the network interface device 116, network path 120, PCI slot 114 and network path 216. The management controller device 112 is also known and referred to as a baseboard management controller (BMC).

The management controller device 112 is configured to monitor network settings (e.g., BIOS settings and operations) associated with host server 110. For example, the management controller device 112 may monitor requests by the user device 300 (for example, via the network card device 200) for access to host server 110 to configure the network settings. The management controller device 112 is also configured to monitor performance characteristics of host server 110. For example, the management controller device 112 may monitor parameters of host server 110, such as temperature, cooling fan speeds, power status, operating system functionality, etc. The management controller device 112 can modify the performance characteristics based on operating requirements associated with host server 110.

The PCI card slot 114, as described above, is configured to interface with pins 215 of connector 214 of the network card device 200 and in so doing establish a hardware connection between host server 110 and the network card device 200. As a result, the network path 216 is established between the PCI card slot device 114 and the network controller device 202. Software on the host server 110 determines whether a valid connection has been made between the two devices. For example, software on the host server 110 reads a field replacement unit (FRU) physically attached to the network card device 200 over one or more I²C bus lines to determine whether the host server 110 is connected to the network card device 200. In one example, the network path 216 is a medium dependent interface (MDI) or a reverse MDI (MDIX) connection. Thus, the network card device 200 is able to transmit network communications (e.g., commands originating from user device 300 to modify network settings) to the host server 110 across the network path 216. Additionally, when connector 214 is installed in the PCI card slot 114, the network card device 200 is able to receive power from the host server 110 (in particular, the PCI card slot 114) over the power paths 218 and 220, as described above.

The power supply device 126 of the host server 110 provides power to the PCI card slot 114 via path 132. The power supply device 126 also provides power to the management controller device 112 via path 133. For example, the power supply device 126 may be configured to provide power to the PCI card slot 114 (via path 132) and to the management controller device 112 (via path 133) at a normal power level, a standby power level and an enhanced standby level. The normal power level may be a power level that is relatively higher than the standby power level, such that the normal power level enables enhanced network performance or enhanced functions/features by the host server 110 (e.g., when the host server 110 is operating in a "normal" operational mode) while standby power enables only minimal performance or functions/features of host server 110. In one example, when the power supply device 126 supplies standby power, only the management controller device 112 and the network interface port 124 of the host server 110 and the power controller unit 210 of the network card device 200 receive power and are active. In another example, when the power supply device 126 supplies normal power, every component of the host server 110 and the network card device 200 receives power and are active. The power supply device 126 may also supply power in the enhanced standby mode, in which the power supply device 126 delivers enough power to operate components of the host server 110 in the standby mode (as described above) and additionally to provide enough power to all of the components of the network card device 200 to allow the network card device 200 to configure network settings associated with the host server 110. It should be appreciated that while multiple standby modes (e.g., standby mode and enhanced standby mode) are described, the power supply device 126, in one example, may deliver power in only two modes, one of which comprises is a standby mode (standby mode or enhanced standby mode, described above) and the other is the normal mode, described above.

The management controller device 112 may enable a transition from a standby power level to the enhanced standby power level by issuing a special I²C command. This special I²C command may comprise a command that originates at I²C port 118 of the management controller device 112 destined for power controller unit 210 of the network card device 200 (via, e.g., I²C bus line 122, PCI card slot 114, connector 214, and I²C bus 218). The power controller unit 210 of the network card device 200 is configured to receive power (e.g., power at a normal power level, standby power level, or enhanced standby power level, as described above) from the PCI card slot 114 when the connector 214 is installed in the PCI card slot 114. The power delivered by the power supply device 126 may flow to the connector 214 of the network card device 200 from the PCI card slot 114.

The I²C port 212 of the power controller unit 210 may be configured to gate the power signals received from the host server 110 across the power paths 218 and 220. For example, a user device 300 may request the management controller device 112 to modify the power level supplied by the power supply device 126 (e.g., to operate in the enhanced standby mode). In this example, the management controller device 112 sends a power signal (e.g., an I²C transaction) to the power controller unit 210, the power paths 218 and 220 on the network card device 200 can act as power rails for power to the network card device 200. For example, the power paths 218 and 220 can act as power rails for standby, enhanced standby or normal power. In this example, the I²C port 212 serves as a general purpose input/output (GPIO) device. After receiving power from the PCI card slot 114, the power controller unit 210 can power the network card device 200. The network card device 200 is capable of being configured by the management controller device 112 when it receives, for example, enhanced standby power from the host server 110, according to the techniques described herein. In other words, when the host server 110 is not in a "normal" operation mode (as described above), only the management controller device 112 configures the network card device 200. When the host server 110 is in a "normal" operation mode, the BIOS 134, processor 128 and the management controller device 112 can all configure the network card device 200.

The processor 128 of the host server 110 is a microprocessor or microcontroller that is configured to execute program logic instructions (i.e., software) for carrying out various operations and tasks described herein. For example, the processor 128 is configured to execute network configuration logic 136 that is stored in memory 130 to configure and modify network settings of the host server 110, as described herein. For example, the processor 128 may modify network settings of the host server 110. The functions of the processor 128 may be implemented by logic encoded in one or more tangible computer readable storage media (e.g., embedded logic such as an application specific integrated circuit, digital signal processor instructions, software that is executed by a processor, etc), wherein memory 130 stores data used for the operations described herein and stores software or processor executable instructions that are executed to carry out the operations described herein.

As stated above, memory 130 is configured to store, for example, BIOS 134 and network configuration logic 136. Memory 130 may comprise read only memory (ROM), random access memory (RAM), magnetic disk storage media devices, optical storage media devices, flash memory devices, electrical, optical or other physical/tangible memory storage devices. Network configuration logic 136 may take any of a variety of forms, so as to be encoded in one or more tangible computer readable memory media or storage device for execution, such as fixed logic or programmable logic (e.g., software/computer instructions executed by a processor) and the processor 128 may be an application specific integrated circuit (ASIC) that comprises fixed digital logic, or a combination thereof. For example, the processor 128 may be embodied by digital logic gates in a fixed or programmable digital logic integrated circuit, which digital logic gates are configured to perform network configuration logic 136. In general, network configuration logic 136 may be embodied in one or more computer readable storage media encoded with software comprising computer executable instructions and when the software is executed operable to perform the operations described herein for logic 136.

Similarly, the processor 222 of the network card device 200 is a microprocessor or microcontroller that is configured to execute program logic instructions (i.e., software) for carrying out various operations and tasks described herein. For example, the processor 222 is configured to execute network settings modification logic 226 that is stored in memory 224 to receive instructions that cause it to adjust network configuration settings of the host server 110 when the host server 110 is in an enhanced standby mode, as described herein. The functions of processor 222 may be implemented by logic encoded in one or more tangible computer readable storage media (e.g., embedded logic such as an application specific integrated circuit, digital signal processor instructions, software that is executed by a processor, etc), wherein memory 224 stores data used for the operations described herein and stores software or processor executable instructions that are executed to carry out the operations described herein.

Memory 224 may comprise ROM, random access RAM, magnetic disk storage media devices, optical storage media devices, flash memory devices, electrical, optical or other physical/tangible memory storage devices. Network settings modification logic 226 may take any of a variety of forms, so as to be encoded in one or more tangible computer readable memory media or storage device for execution, such as fixed logic or programmable logic (e.g., software/computer instructions executed by a processor) and the processor 222 may be an ASIC that comprises fixed digital logic, or a combination thereof. For example, the processor 222 may be embodied by digital logic gates in a fixed or programmable digital logic integrated circuit, which digital logic gates are configured to perform network settings modification logic 226. In general, network settings modification logic 226 may be embodied in one or more computer readable storage media encoded with software comprising computer executable instructions and when the software is executed operable to perform the operations described herein for logic 226.

The power controller unit 212 in the network card device 200 is accessed by the management controller device 112 of the host server 110 over the I²C bus lines to power on the network card device 200 after the host server 110 and the network card device 200 are connected. For example, the management controller device 112 can cause power to be supplied to the network card device 110 in response to a command line interface (CLI) command from the user device 300, via a web user interface format (WebUI) command from the user device 300, or via any public specification format, such as an Intelligent Platform Management Interface (IPMI), Web Services Management (WSMAN), server manager command line protocol, Application Programmable Interface (API), Representational State Transfer (REST) API, etc. In this example, the user device 300 can transmit a CLI, WebUI, or public specification command to the management controller 112 or to the host server 110 to configure network parameters of the host server 110. Upon receiving the command, the host server 110 can modify the network settings, according to the techniques described herein, without fully powering on the host server 110 to a normal operational mode, and also without requiring that the host server 110 be re-booted in order for the network setting changes to take effect.

Figure 3:
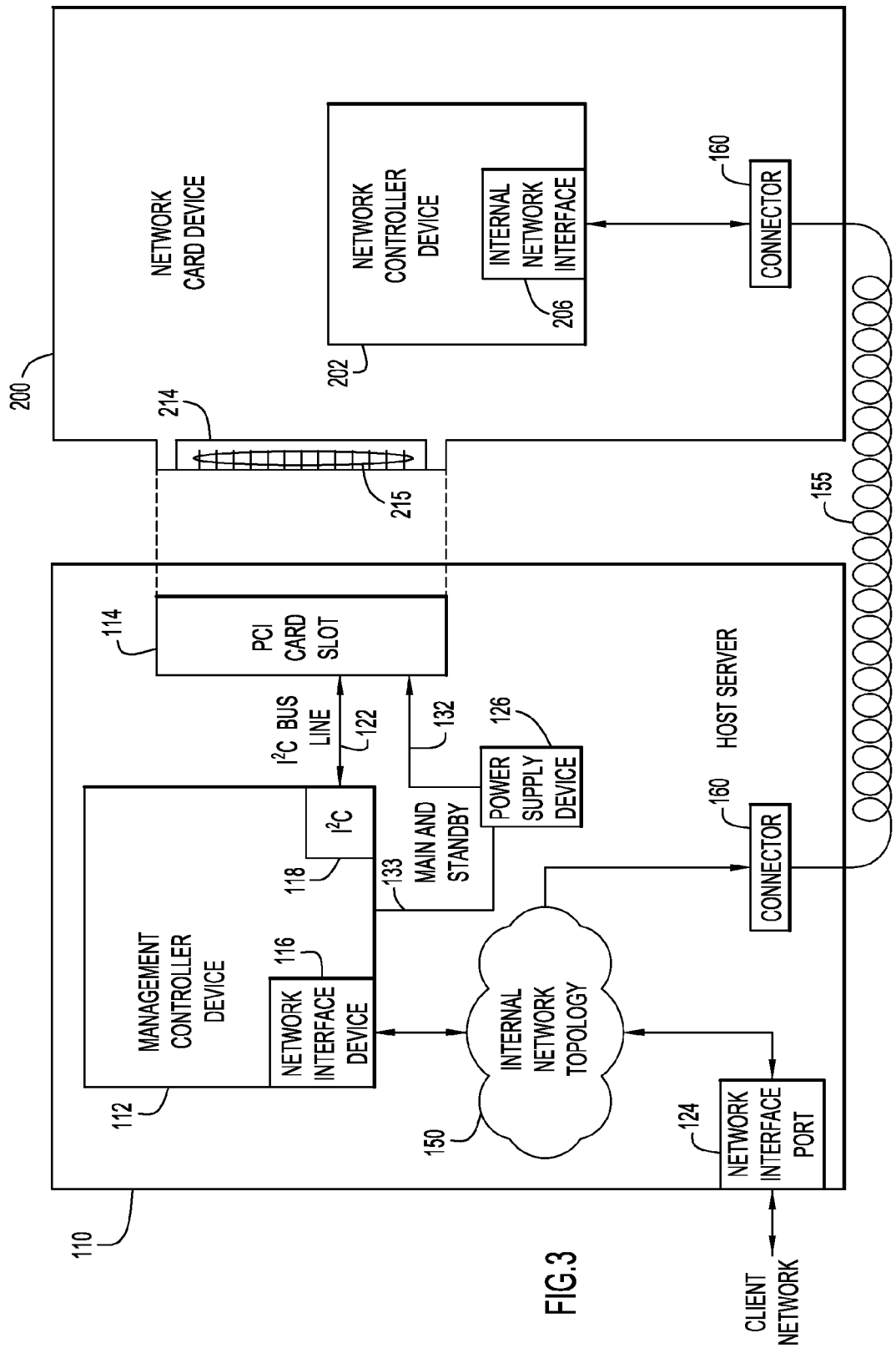
FIG. 3 is an example block diagram of the host server and the network card device coupled to each other by an external cable according to another embodiment.

FIG. 3 shows an embodiment of the host server 110 configured with an internal network topology 150 to allow communications between components of the host server 110. It should be understood that the host server 110 and network card device 200 shown in FIG. 3 comprise the components described above in connection with FIG. 2, and for simplicity, FIG. 3 does not show all of these components. In FIG. 3, the management controller device 112 and network interface port 124 are coupled to each other across the internal network topology 150. In one example, the internal network topology 150 comprises a four port network switch (not shown) as a part of network path 120 (shown in FIG. 2). In this example, the switch provides a connection between the management controller device 112 and the network card device 200 through one of its ports. One of the ports of the switch may provide access to the network interface port 124, while another port of the switch is configured to connect to a LOM. In one example, the LOM is equivalent to a network card device 200 with Ethernet capabilities.

In general, the internal network topology 150 shown in FIG. 3 is any interconnection of one to many components that reside on the host server 110 or the network card device 200 that allow network related communications. It could comprise multiple management controller devices, network switches, network routers, network interface ports, Ethernet components (e.g., multiple LOMs), and FC components. The internal network topology 150 may also comprise actual physical connections used between devices such as multiple document interface (MDI/MDIX), reduced media independent interface (RMII) and gigabit media independent interface (GMII) devices. Network related communications may comprise, for example, any communications of network protocols relating to, for example, user datagram protocol (UDP), transport control protocol/internet protocol (TCP/IP), asynchronous transfer mode (ATM), and any protocol at the electrical, physical or software level described by the Institute of Electrical and Electronic Engineers (IEEE).

The host server 110 is coupled to the network card device 200 via an external connector device 155, e.g., a cable. The external connector device 155 interfaces respective connector device components 160 on the host server 110 and the network card device 200 to establish the connection. The external connector device 155 enables a network communication path between the host server 110 and the network card device 200 and also enables a power path between the host server 110 and the network card device 200. It should be appreciated that, though not shown in FIG. 3, one or more I²C bus paths may provide power to components of the network card device 200. For simplicity, network card device 200 in FIG. 3 does not show all the components described in connection with FIG. 2, above, though it should be appreciated that the network card device 200 depicted in FIG. 3 may comprise these components.

Figure 4:
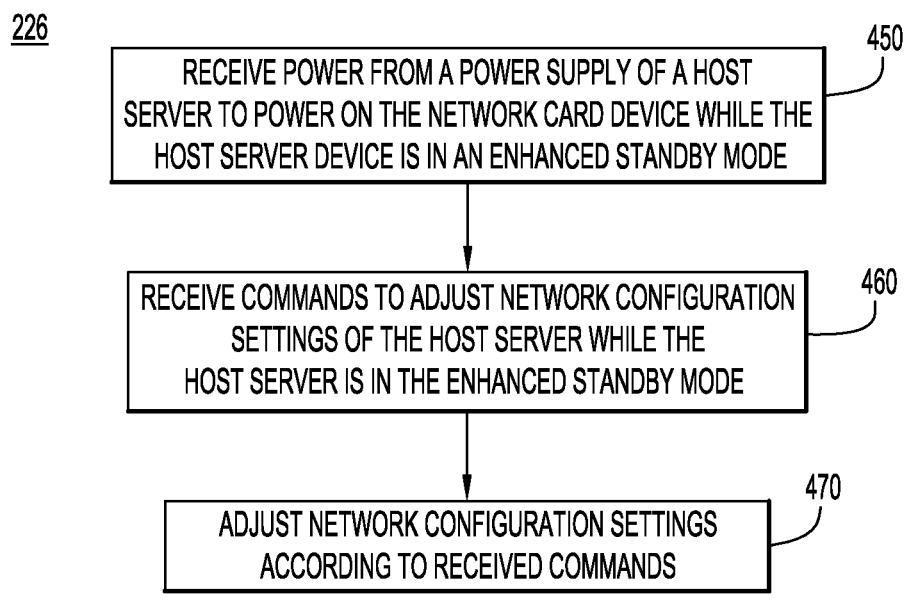
FIG. 4 is a flow chart depicting operations of network access configuration logic executed in the network card device to receive instructions in order to adjust network settings for one or more ports of the network card device used by the host server.

FIG. 4 shows a flow chart depicting operations of network settings modification logic 226 to adjust network configuration settings associated with host server 110. At 450, the network card device 200 receives and responds to a command that causes power from the power supply 126 (via, e.g., the PCI card slot 114) of the host server 110 to power on the network card device 200 (e.g., to operate in an enhanced standby mode). Even though the host server 110 is in enhanced standby mode at this time, the power supplied by the host server 110 is sufficient to power the network card device to allow it to perform the network settings changes described herein. After receiving power from the power supply 126, the management controller device 112 receives commands over the client network 400 (e.g., from user device 300) to adjust network settings associated with the host server 110 while the host server 110 is in the enhanced standby mode. In one example, the management controller device 112 may receive commands over customer network 400 from the user device 300 in communication with the network card device 200 and the host server 110. The management controller device 112 translates the commands (e.g., the users' requests) to commands configured to be understood by the network card device 200. At 460, the network card device 200 receives the commands from the management controller device 112 to adjust the network configuration settings. Thus, while the host server 110 is in enhanced standby mode it is, for all practical purposes, not capable of normal operations that it would otherwise be capable of when in normal mode. After receiving the commands to adjust network configuration settings, at 470, the network card device 120 adjusts the network configuration settings according to the received commands.

Figure 5:
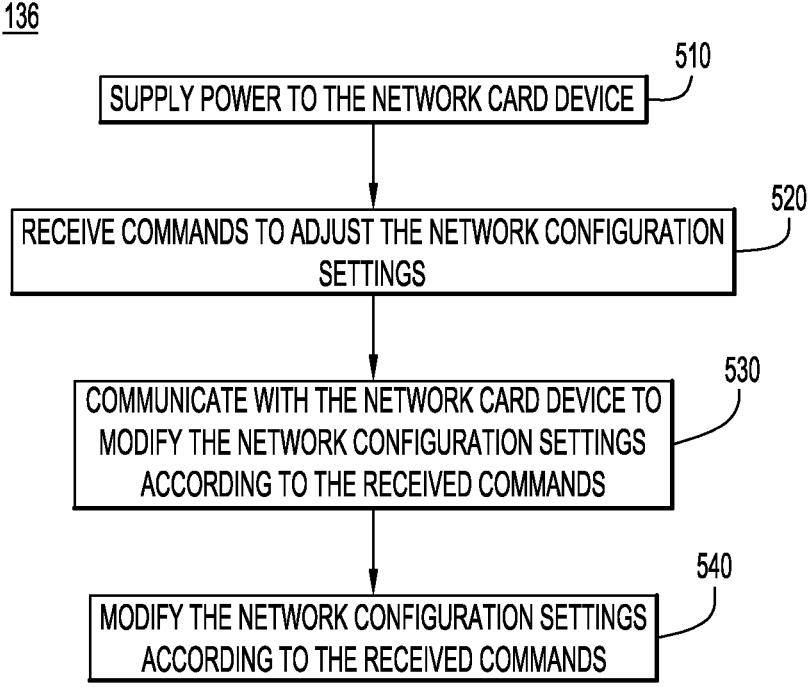
FIG. 5 is a flow chart depicting operations of network configuration logic executed in the host server to configure and modify the network settings for one or more ports of the network card device used by the host server.

FIG. 5 shows a flow chart depicting operations of network configuration logic 136 to configure and modify the network settings of the host server 110. At 510, the host server 110 supplies power to the network card device 200. The power supplied from the host server 110 to the network card device 200 (when the host server is in the enhanced standby mode) is sufficient to power the network card device 200 to perform the network setting modification/configuration operations described herein. After supplying the power, the host server 110, at 520, receives commands to adjust the network configuration settings from the user device 300. After receiving the commands to adjust the network configurations settings, at 530, the management controller device 112 communicates with the network card device 200 to instruct the network card device to change or modify a network related parameter. At 540, the management controller device 112 modifies the network configuration settings associated with one or more network ports of the network card device 200 used by the host server 110 according to the received commands.

As explained above, the network settings that are changed may involve a setting or parameter associated with one or more network ports on the network card device that are used by the host server or a setting or parameter associated with one or more network ports of the host server itself, if such exist.

Examples of network settings that may be configured/modified include, but are not limited to:

For Ethernet interfaces (e.g., Ethernet ports):
Create, Delete, Modify:
Enable/disable Preboot Execution Environment (PXE) boot
Network Interface Virtualization (NIV) Channel number
CLI options
Class of Service
Media Access Control (MAC) address
Ethernet Maximum Transmission Unit (MTU)
PCI bus device order
Port profile name
Egress rate limiting
Use host specified Class of Service (CoS) priority
External Ethernet interface
NIV uplink failback timeout
Uplink Failover
Virtual Local Area Network (VLAN) membership
VLAN trunking
Completion Queue
Ethernet interrupt
Transmission Control Protocol (TCP) offload
Ethernet Receive Queue
Receive Side Scaling
Ethernet Transmit Queue
For FC interfaces (e.g., FC port):
Create, Delete, Modify:
Enable/disable FC Storage Area Network (SAN) boot
CLI options
Class of Service
Error Detect Timeout
MAC address
Maximum Data Field Size
PCI express device order
Enable/disable Logical Unit Number (LUN) mapping
Egress rate limiting
Resource Allocation Timeout
VLAN membership
World wide node name
World wide port name
Fibre Channel Boot LUN Entry
Fibre Channel Error Recovery
Fibre Channel Interrupt
Fibre Channel Persistent LUN Binding
Fibre Channel port
Fibre Channel port fabric-login
Fibre Channel port port-login
Fibre Channel receive queue
Fibre Channel Small Computer System Interface (SCSI) Input/Output
Fibre Channel transmit queue In summary, the techniques and apparatus described herein allow for configuring and managing host-side networking parameters without the need to power-on the host server. This reduces the amount of time required for a customer to bring a servers out-of-the-box to an operational state. In addition, these techniques provide for an added layer of security whereby configurations, such as a firewall setting, can be made by the management controller device in the host server. The network settings can be made even before the host server has booted to an operating system for the first time.

Furthermore, a method is provided comprising: at a network card device coupled to a host server, receiving power from the host server to power the network card device to allow the network card device to configure network settings associated with the host server while the host server is in a standby mode; and receiving commands at the network card device over a network to adjust the network settings while the host server is in the standby mode.

Additionally, a method is provided comprising: at a host server coupled to a network card device, receiving from commands to adjust network settings; supplying power to the network card device while the host server is in a standby mode in which the host server supplies power to the network card device to allow the network card device to configure network settings; communicating the commands to the network card device; and modifying the network settings based on the received commands.

In addition, one or more computer readable storage media is provided that is encoded with software comprising computer executable instructions and when the software is executed operable to: receive and respond to a command that causes power from a power supply of a host server to power a network card device in order to allow the network card device to configure network settings associated with the host server while the host server is in a standby mode; and receive commands at the network card device over a network to adjust the network settings while the host server is in the standby mode.

Furthermore, an apparatus is provided comprising one or more network ports; a network interface device configured to enable communications over a network; a power controller unit configured to receive power from a power supply to power the apparatus; a processor configured to: receive and respond to a command that causes power from a power supply of the host server to be coupled to the power controller unit in order to configure network settings associated with the host server with the host serve is in a standby mode; and receive commands to adjust network settings while the host server is in the standby mode.

The above description is intended by way of example only. Various modifications and structural changes may be made therein without departing from the scope of the concepts described herein and within the scope and range of equivalents of the claims.

What is claimed is:

1. An apparatus comprising:
   a network card including a network controller and communication ports connected thereto;
   a host server including: a network port configured to communicate with a user device through a network; a processor; a management controller coupled to the network port, the processor, and the network card network controller; and a power supply configured to supply power to the network card and the host server at a selected one of normal, standby, and enhanced standby power levels responsive to a command so as to cause the network card and the host server to operate in one of normal, standby, and enhanced standby modes, respectively;
   a card slot connection that connects the management controller and the power supply of the host server to the network card; and
   a power management bus that routes the selected power level from the power supply of the host server to the network card through the card slot connection; wherein:
      in the normal mode, all of the host server components and all of the network card components are activated responsive to the normal power level, and the management controller and the processor of the host server are each able to configure network parameters associated with the host server on the network card;
in the standby mode, only the management controller and the network port on the host server are activated responsive to the standby power level; and
in the enhanced standby mode, only the network controller, the network port, and the management controller are activated responsive to the enhanced standby power level, and the management controller is able to configure network setting in the network card device for the host server.

2. The apparatus of claim 1, wherein, in the enhanced standby mode, the management controller is configured to:
receive a configure command from the user device through the network port to configure network parameters used by the host server; and
forward the configure command to the network controller to cause the network controller to configure the network parameters.

3. The apparatus of claim 1, wherein the management controller is configured to receive a request from the user device via the network port to operate in the enhanced standby mode; and in response the user request, command the power supply to provide power at the enhanced standby power level.

4. The apparatus of claim 3, wherein, in the enhanced standby mode, the management controller is configured to:
receive a configure command from the user device to configure network parameters used by the host server; and
forward the configure command to the network controller to cause the network controller to configure the network parameters.

5. The apparatus of claim 4, wherein the network card further includes:
an external connector configured to connect with an external cable and connected to the network controller.

6. The apparatus of claim 1, wherein the host server further includes:
an external connector configured to connect with an external cable to carry the supply power to the network card and enable network communications between the host server and the network card; and
a multiport network switch coupled to the management controller, the network port, and the external connector.

7. The apparatus of claim 1, wherein, in the enhanced standby mode, the management controller is configured to:
receive a configure command from the user device through the network port to configure network parameters used by the host server; and
forward the configure command to the network controller to cause the network controller to configure the network parameters.

8. A method comprising:
providing a network card including a network controller and communication ports connected thereto;
providing a host server including: a network port configured to communicate with a user device through a network; a processor; a management controller coupled to the network port, the processor, and the network card network controller; and a power supply;
supplying power to the network card and the host server at a selected one of normal, standby, and enhanced standby power levels responsive to a command so as to cause the network card and the host server to operate in one of normal, standby, and enhanced standby modes, respectively;
connecting the management controller and the power supply of the host server to the network card using a card slot connection;
routing the selected power level from the power supply of the host server to the network card through the card slot connection via a power management bus, wherein:
operations performed in the normal mode include activating all of the host server components and all of the network card components responsive to the normal power level, and using each of the management controller and the processor to configure network parameters associated with the host server on the network card;
operations performed in the standby mode include activating only the management controller and the network port on the host server responsive to the standby power level; and
operations performed in the enhanced standby mode include activating only the network controller, the network port, and the management controller responsive to the enhanced standby power level, and using the management controller to configure network settings in the network card device for the host server.

9. The method of claim 8, further comprising, for the normal mode:
commanding the power supply to supply power at the normal power level.

10. The method of claim 9, further comprising, for the standby mode:
commanding the power supply to supply power at the standby level.

11. The method of claim 8, for the enhanced standby mode:
at the management controller, receiving a configure command from the user device via the network port to configure network parameters used by the host server; and
forwarding the configure command from the management controller to the network controller to cause the network controller to configure the network parameters.

12. The method of claim 8, further comprising, at the management controller:
receiving a request from the user device via the network port to operate in the enhanced standby mode; and
in response the user request, commanding the power supply to provide power at the enhanced standby power level.

13. The method of claim 12, further comprising, in the enhanced standby mode, at the management controller:
receiving a configure command from the user device to configure network parameters used by the host server; and
forwarding the configure command to the network controller to cause the network controller to configure the network parameters.

14. The apparatus of claim 13, further comprising:
connecting an external connector of the network card to the network controller using an external cable.

* * * * *